Jan. 3, 1933. E. ROTHEIM 1,892,750
METHOD AND APPARATUS FOR ATOMIZING MATERIALS
Filed Nov. 12, 1928 2 Sheets-Sheet 1
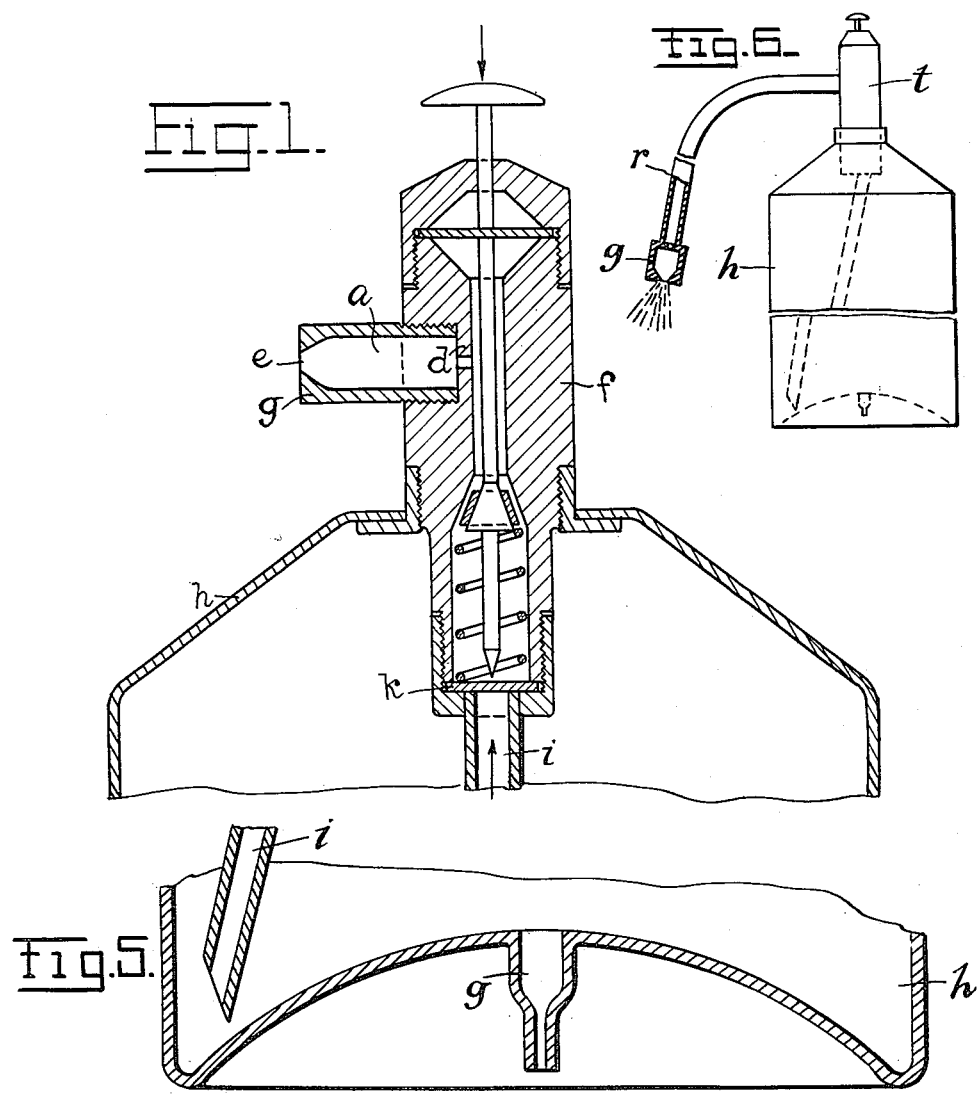

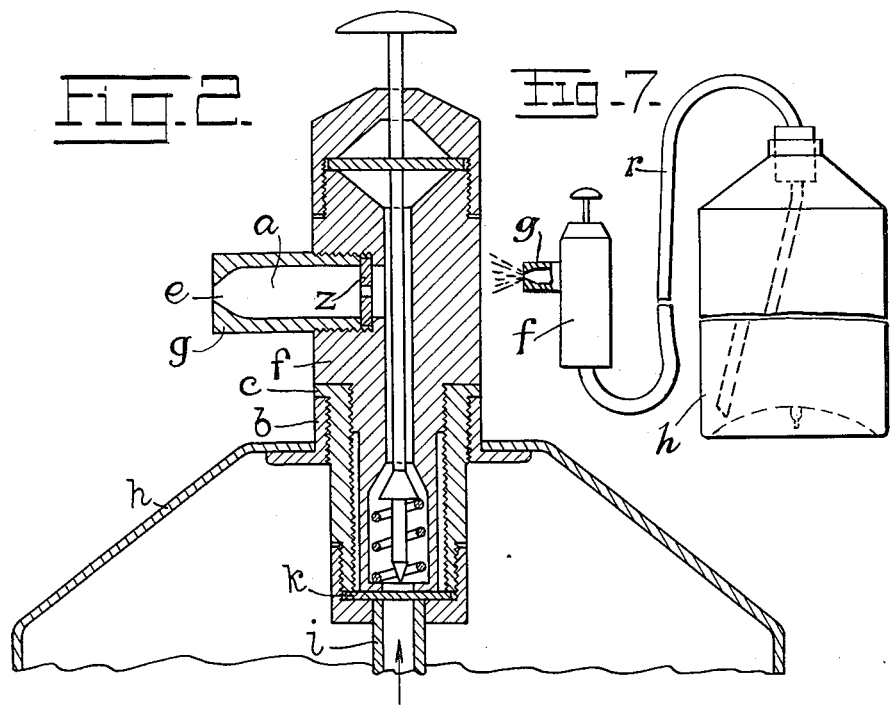
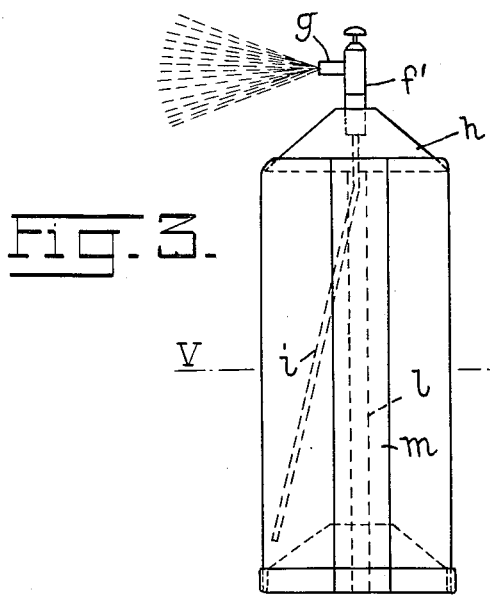
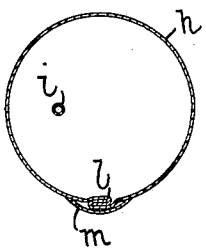

UNITED STATES PATENT OFFICE

ERIK ROTHEIM, OF OSLO, NORWAY

METHOD AND APPARATUS FOR ATOMIZING MATERIALS

Application filed November 12, 1928, Serial No. 318,878, and in Norway November 23, 1927.

This application is in part a division of my former application Serial No. 223,143, filed September 30th, 1927 for method and means for atomizing or distribution of liquid or semiliquid materials.

This invention has for its object a process as well as an apparatus for atomizing materials of a liquid or semiliquid consistency by means of a gaseous pressure medium which forces the material through a suitable discharging nozzle.

According to the invention the pressure medium is a gas condensible at comparatively low pressures preferably below 20 or 40 atmospheres.

As examples of condensible gases particularly suitable for the purpose may be mentioned dimethylether ($CH_3OCH_3$), methyl chloride ($CH_3Cl$), isobutan and other hydrocarbons for example low boiling petroleum distillates such as rhigolene, cymogene etc. (with boiling points about 0° C.) methylnitrite ($CH_3ONO$) with boiling point, 12° C., vinylchloride (ethylene chloride) with boiling point, 15° C. to 18° C.

The substances enumerated above are all gaseous at ordinary temperatures and pressures but condensible at comparatively low pressures (below 10 atmospheres) and are in a condensed condition able to dissolve most of the materials to be atomized according to the invention. These materials are in most instances insoluble or only slightly soluble in water.

If a material such as for example cellulose lacquer containing a proportion of a condensible gas such as dimethyl ether dissolved in the material is caused to pass from a pressure resisting vessel containing same under pressure, through a discharge opening or through an ordinary nozzle it has been found that a very incomplete atomization of the material is effected. A spray of for example cellulose lacquer produced in this manner is not suitable for producing surface coatings. Spray produced in the said manner is generally not in possession of the properties required when materials are to be uniformly distributed on surfaces or in the atmosphere, as in the case of lacquers, paints, disinfectants, insecticides, cosmetic preparations, perfumes etc.

According to the present invention a satisfactory atomization of the materials in question is brought about by causing the material together with a condensible gas dissolved therein to expand totally or in part on its way to the discharge opening.

When for example linseed oil containing 20 per cent dimethyl ether dissolved therein is caused to flow from a vessel wherein the solution is held under a pressure above the condensation pressure of dimethyl ether, through an opening of a certain sectional area (for example 1 mm$^2$) into a chamber having a volume of for example 20 mm$^3$ and from this chamber further into the atmosphere through an opening of a somewhat greater sectional area than the first named opening (for example 1.2 mm$^2$) than the fluid pressure agent (dimethyl ether) in the said chamber undergoes a partial or total expansion to a gas and during the expansion effects subdivision of the solution in the expansion chamber. By this means an ideal, uniform atomization is brought about so that the spray leaving the greater discharge opening is in possession of the properties required for application.

Several embodiments of apparatus suitable for carrying the invention into effect are illustrated in the accompanying drawings.

Fig. 1 is a vertical sectional view of the top portion of a pressure vessel with outlet valve and atomizer.

Fig. 2 is a vertical sectional view of a further embodiment of valve and atomizer.

Fig. 3 illustrates on a reduced scale a pressure bottle with valve and atomizer.

Fig. 4 is a sectional view of the pressure bottle.

Fig. 5 is a detail sectional view of the bottle illustrated in Fig. 1.

Figs. 6–7 illustrate further modifications of apparatus constructed in accordance with the invention.

In the example illustrated in Fig. 1 the expansion arrangement is constructed in combination with the discharge nozzle (ejector). In this figure $f$ is the body of the valve chamber on the container from which solution can be delivered by depressing the button.

$g$ is the ejector, $d$ is a partition wall with opening, $a$ is the expansion chamber and $e$ the opening to the atmosphere. The hole in the partition $d$ is of a somewhat smaller sectional area than the discharge opening $e$. There may of course be arranged one or more openings of any suitable form in the partition $d$, and also at $e$ one or more openings or channels of any desired shape. The most important characteristic feature consists therein that the resistance to flow is greater anterior to the expansion chamber $a$ than behind same. In general this will mean, that the sum of sectional areas of openings in the partition $d$ is equal with or less than the sum of the sectional areas of the outlet openings at $e$. In the example illustrated in Figure 3 the partition wall $d$ of Figure 1 is replaced by a removable disc $z$ having a central hole through which the stream of liquid enters the expansion chamber $a$.

The apparatus may also be arranged in such a manner that the resistance to flow in the ascension pipe and in the valve at its opening is equivalent to the resistance to flow of the opening in the partition $d$ shown in Fig. 1. This partition is then omitted. The valve spindle or any other suitable device may also be caused to alter the resistance to flow anterior to the expansion chamber continuously or in steps. This resistance to flow may be altered in value to be made equal with or larger than the resistance to flow in the opening $e$ of Fig. 1. Hereby is produced a greater or less quantity of spray from the opening of Fig. 1 or a change in the properties of the spray.

The expansion arrangement (spray nozzle) may also be connected to a vessel containing material and pressure agent by one or more pipes (for example rigid or flexible metal tubes) through which the contained solution is supplied to the spray nozzle. The pressure button with valve can in this case be situated on the container as illustrated in Figure 6 or on the spray nozzle or on both. The spray nozzle (expansion ejector) can be fastened on a suitable handle for example in the form of a spraying pistol and connected with the container through pipes or flexible tubes. The container may also be constructed without ascension pipe and be connected with the spray nozzle.

The apparatus illustrated in Fig. 2 can for example be filled in the manner that the container $h$ (for example a sheet iron bottle with nipple $b$ secured by soldering) is first filled with for example paint whereupon the container with contents is cooled to below the boiling point of the pressure agent (for methyl ether $-24.9°$ C.). From another container the pressure agent at a temperature below the boiling point can be introduced into the sheet-iron bottle in suitable quantity through the opening of the nipple $b$, then the nipple $c$ with stanniol diaphragm $k$ and ascending pipe $i$ is screwed on, and the bottle is tight for pressure load from the contents at ordinary temperature.

The valve chamber $f$ (Fig. 2) with pressure button and ejector can be screwed on to the bottle before use for spraying and be unscrewed and removed after use and thereupon employed on a plurality of new bottles of the same construction. The containers are thus constructed without a special pipe (Fig. 5) for filling at the bottom. Of course the bottle can be filled also in other ways without special filling pipes.

The containers or bottles can be made from ordinary sheet iron which is folded and soldered in the usual manner. The joint $l$ is suitable afterwards provided with a strengthening strip $m$ of for example sheet iron soldered on as shown in Fig. 3.

The containers or bottles may also be so constructed that they are completely emptied by the first opening. In this case the construction becomes more simple. The bottles then need no valve or pressure button but only a closure at $e$. This opening can then be uncovered once for all for example by removing a cap $u$ over the ejector or a pin $t$ in the opening $e$.

The invention comprises the use of the described method for atomizing or distribution of liquids, semifluid or solid substances (and solutions thereof) of any kind such as for example oils, fats, liquid soaps, resins paraffines waxes, colouring matter, lacquers (for example cellulose lacquers paints, varnishes, rubber, gums, cements, disinfecting agents (comprising fungicides and insecticides)) protecting agents impregnation and coating compositions, polishing agents fertilizers, fire extinguishers, cosmetical preparations, perfumes, organic and inorganic liquids for any use (such as for example as solvents) etc.

When the method is used for example for eau de Cologne the new result is attained that the spray becomes considerably cooler than the atmosphere on account of the expansion of the added condensed gas. Viscous products such as varnishes and lacquers are made more thinly fluid by the addition of dimethyl ether and attain a sprayable consistency without heating. Cosmetic products such as liquid or solid brilliantines, pomatums, vaselines, crèmes, toilette liquids and the like can be employed in a more practical and hygienic manner by the use of the described method. Ski coatings for example to use on hard snow (consisting in most cases of wood tar with dissolved rubber), which are usually sticky and difficult to apply and must be "burnt" on the ski surface, are brought into a thinly fluid condition by the addition of a condensed gas of the character above explained and can be applied without difficulty. The condensed gas readily evaporates after the coating has been applied to the ski surface.

It will be understood that the method can be used in connection with any substance (of any state of aggregation) which can be brought into sprayable condition by means of dimethyl ether or other readily condensible gas.

I claim:

1. Method of atomizing materials in which a solution of the material in a liquefied gas is caused to flow in the form of a confined stream from a body of the solution maintained under a pressure not less than the liquefaction pressure of the said gas under the prevailing conditions towards a point of discharge into the atmosphere, subjecting the confined stream to a substantial and sudden release of pressure to below the liquefaction pressure of the said gas before the stream reaches the point of discharge, the said release of pressure being only partial but sufficient to result in converting the solution into a dispersion of non-gaseous material in a flowing compressed gas, and discharging this dispersion through a restricted orifice into the atmosphere.

2. Method of atomizing materials in which a solution of the material in a liquefied gas comprising a gaseous carbon compound containing a hydrocarbon radical is caused to pass in a form of a confined stream from a body of the solution maintained under a pressure sufficient to retain the said gaseous hydrocarbon compound in a liquefied state towards a point of discharge into the atmosphere, subjecting the said confined stream to a substantial and sudden release of pressure sufficient to effect evaporation of the said liquefied gas before the stream reaches the point of discharge into the atmosphere, allowing a portion of said gaseous hydrocarbon compound to escape from the solution and discharging the resulting gas and solution through a restricted orifice.

3. Method of atomizing materials in which a solution of the material in a liquefied gas comprising a gaseous carbon compound containing a hydrocarbon radical is caused to pass in the form of a confined stream from a body of the solution maintained under a pressure sufficient to retain the said gas in a liquefied state towards a point of discharge into the atmosphere and subjecting the said confined stream to a substantial and sudden release of pressure to below the liquefaction pressure of the said gaseous hydrocarbon compound before the stream reaches the point of discharge into the atmosphere, the said sudden release of pressure taking place at a point in the confined stream where the stream passes without substantial deflection from its point of sudden release to a restricted outlet opening and through said opening into the atmosphere.

4. As a new article of manufacture an apparatus for atomizing materials comprising a hermetically sealed can charged with a solution of the material to be atomized in a liquefied gaseous hydrocarbon compound under a pressure sufficient to maintain the said hydrocarbon compound in a liquefied condition in combination with an ejection member with an internal channel, means for placing said channel in communication with the charge in the can, the said internal channel having a widened part representing an expansion chamber immediately in rear of the exit opening of the ejection member the fluid passage being restricted as it enters the expansion chamber and the part of the channel opening into the said expansion chamber being directed substantially parallel to a line from the center of said part of the channel and through the center of the discharge opening of the expansion chamber.

5. As a new article of manufacture an apparatus for atomizing materials comprising a hermetically sealed can charged with a solution of a material to be atomized in a liquefied gas under a pressure not less than the liquefaction pressure of the said gas under the prevailing conditions, an atomizer nozzle having a channel, means for placing said channel in communication with the charge in the can, an expansion chamber in the said channel immediately adjacent to the exit opening of said nozzle, perforated wall in the channel at the entrance end of the expansion chamber, the said wall having at least one short restricted passage admitting fluid into the expansion chamber from the body of solution, the said passage in the wall being so arranged as to cause the entering flow to be directed substantially parallel to a straight line from the center of the entrance opening to the exit opening of the expansion chamber.

In testimony whereof I have signed my name unto this specification.

ERIK ROTHEIM.